US010534251B2

(12) United States Patent
Dewald et al.

(10) Patent No.: US 10,534,251 B2
(45) Date of Patent: *Jan. 14, 2020

(54) HIGH CONTRAST DISCRETE INPUT PRISM FOR IMAGE PROJECTORS

(71) Applicant: DOLBY LABORATORIES LICENSING CORPORATION, San Francisco, CA (US)

(72) Inventors: Duane Scott Dewald, Plano, TX (US); Nathan Wainwright, Plano, TX (US); Douglas J. Gorny, Pacifica, CA (US); Martin J. Richards, Gig Harbor, WA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/222,943

(22) Filed: Dec. 17, 2018

(65) Prior Publication Data

US 2019/0137859 A1   May 9, 2019

Related U.S. Application Data

(63) Continuation of application No. 15/540,946, filed as application No. PCT/US2015/067197 on Dec. 21, 2015, now Pat. No. 10,197,902.

(Continued)

(51) Int. Cl.
*G03B 21/28* (2006.01)
*G02B 5/04* (2006.01)
(Continued)

(52) U.S. Cl.
CPC ............... *G03B 21/28* (2013.01); *G02B 1/11* (2013.01); *G02B 5/04* (2013.01); *G02B 27/1033* (2013.01);
(Continued)

(58) Field of Classification Search
CPC .. G03B 21/008; G03B 21/28; G03B 21/2013; G03B 21/2033; G03B 21/2066;
(Continued)

(56) References Cited

U.S. PATENT DOCUMENTS 3,659,918 A   5/1972   Tan
5,619,284 A   4/1997   Magocs
(Continued)

FOREIGN PATENT DOCUMENTS

JP   2000-266915   9/2000
JP   5484258   5/2014

OTHER PUBLICATIONS

Kwok H.S. et al., "Triochroic prism assembly for separating and recombining colors in a compact projection display", Applied Optics, vol. 39, No. 1, pp. 168-172, Jan. 1, 2000.

*Primary Examiner* — Sultan Chowdhury

(57) ABSTRACT

Prism assemblies for projector display systems disclosed receive inputs from discrete color channels (e.g., red, green and blue channels. In one embodiment, "off state" light from the red, green, and blue DLP modulation may be reflected away from on-state light paths within the prism, tending to avoid uncontrolled scatter. In other embodiments, by keeping the colors separate for much of the prism path length, power levels may be significantly reduced at typical failure points. Light efficiency may be increased significantly when using discrete light sources like LEDs and lasers by removal of the additional red, green, and blue separation and recombination losses.

14 Claims, 12 Drawing Sheets

Related U.S. Application Data

(60) Provisional application No. 62/240,287, filed on Oct. 12, 2015, provisional application No. 62/200,417, filed on Aug. 3, 2015, provisional application No. 62/099,054, filed on Dec. 31, 2014.

(51) Int. Cl.

| | | |
|---|---|---|
| *G03B 21/00* | (2006.01) | |
| *G03B 21/20* | (2006.01) | |
| *G03B 33/12* | (2006.01) | |
| *H04N 9/31* | (2006.01) | |
| *G02B 1/11* | (2015.01) | |
| *G02B 27/10* | (2006.01) | |
| *G02B 27/09* | (2006.01) | |

(52) U.S. Cl.
CPC ....... *G03B 21/008* (2013.01); *G03B 21/2013* (2013.01); *G03B 21/2066* (2013.01); *G03B 33/12* (2013.01); *H04N 9/3126* (2013.01); *G02B 27/0994* (2013.01)

(58) Field of Classification Search
CPC .. H04N 9/3161; H04N 9/3164; H04N 9/3114; H04N 9/3102; H04N 9/3111; H04N 9/3117; H04N 13/0422; H04N 13/0438; H04N 13/0459; H04N 13/0427; H04N 13/0443
See application file for complete search history.

(56) References Cited

U.S. PATENT DOCUMENTS

| | | |
|---|---|---|
| 6,663,243 B2 | 12/2003 | Fielding |
| 6,676,260 B2 | 1/2004 | Cobb |
| 6,869,190 B2 | 3/2005 | Goto |
| 7,334,898 B2 | 2/2008 | Seto |
| 7,359,026 B2 | 4/2008 | Bullwinkel |
| 7,659,880 B2 | 2/2010 | Miyazawa |
| 7,665,850 B2 | 2/2010 | Penn |
| 7,784,949 B2 | 8/2010 | Yamauchi |
| 7,871,165 B2 | 1/2011 | Silverstein |
| 7,891,816 B2 | 2/2011 | Silverstein |
| 7,926,951 B2 | 4/2011 | Bietry |
| 7,938,541 B2 | 5/2011 | Mizushima |
| 7,952,806 B2 | 5/2011 | Callen |
| 7,959,297 B2 | 6/2011 | Silverstein |
| 7,993,014 B2 | 8/2011 | Penn |
| 8,033,666 B2 | 10/2011 | Silverstein |
| 8,066,382 B2 | 11/2011 | Silverstein |
| 8,066,389 B2 | 11/2011 | Silverstein |
| 8,125,702 B2 | 2/2012 | Ward |
| 8,132,919 B2 | 3/2012 | Harland |
| 8,198,573 B2 | 6/2012 | Kamijima |
| 8,220,931 B2 | 7/2012 | Silverstein |
| 8,235,531 B2 | 8/2012 | Silverstein |
| 8,287,129 B2 | 10/2012 | Kurtz |
| 8,305,502 B2 | 11/2012 | Silverstein |
| 8,379,322 B2 | 2/2013 | Smith |
| 8,444,275 B2 | 5/2013 | Kurtz |
| 8,531,492 B2 | 9/2013 | Wallener |
| 8,649,094 B2 | 2/2014 | Kurtz |
| 8,684,533 B2 | 4/2014 | Whitehead |
| 8,786,943 B2 | 7/2014 | Silverstein |
| 8,830,580 B2 | 9/2014 | Kurtz |
| 8,890,905 B2 | 11/2014 | Kwong |
| 9,135,864 B2 | 9/2015 | Shields |
| 2005/0168697 A1 | 8/2005 | Bruzzone |
| 2006/0007401 A1 | 1/2006 | Ho |
| 2007/0024945 A1 | 2/2007 | Huang |
| 2007/0085970 A1 | 4/2007 | Yoshida |
| 2007/0103788 A1 | 5/2007 | Magarill |
| 2007/0252957 A1 | 11/2007 | Penn |
| 2008/0084545 A1 | 4/2008 | Chen |
| 2009/0009885 A1* | 1/2009 | Smith .................... G02B 13/18 359/708 |
| 2009/0153752 A1 | 6/2009 | Silverstein |
| 2010/0007852 A1* | 1/2010 | Bietry .................... G03B 21/28 353/8 |
| 2010/0110390 A1* | 5/2010 | Andersen ............ H04N 9/3152 353/37 |
| 2011/0013144 A1 | 1/2011 | Silverstein |
| 2011/0279749 A1 | 11/2011 | Erinjippurath |
| 2012/0140186 A1 | 6/2012 | Kuwata |
| 2012/0182484 A1 | 7/2012 | Imai |
| 2013/0033685 A1 | 2/2013 | Katou |
| 2013/0128232 A1 | 5/2013 | Laino |
| 2013/0162954 A1 | 6/2013 | Huang |
| 2014/0028697 A1 | 1/2014 | Kurtz |
| 2014/0028698 A1 | 1/2014 | Maier |
| 2014/0028699 A1 | 1/2014 | Kurtz |
| 2014/0347634 A1 | 11/2014 | Bommerbach |
| 2016/0033757 A1 | 2/2016 | Kurtz |

\* cited by examiner

HIGH CONTRAST DISCRETE INPUT PRISM FOR IMAGE PROJECTORS

CROSS REFERENCE TO RELATED APPLICATIONS

This application is a continuation of U.S. application Ser. No. 15/540,946, filed Jun. 29, 2017, which in turn is the 371 national stage of PCT Application No. PCT/US2015/067197, filed Dec. 21, 2015. PCT Application No. PCT/US2015/067197 claims priority to U.S. Patent Application No. 62/240,287, filed on Oct. 12, 2015, U.S. Patent Application No. 62/200,417, filed on Aug. 3, 2015 and U.S. Provisional Patent Application No. 62/099,054, filed on Dec. 31, 2014, each of which is hereby incorporated by reference in its entirety.

TECHNICAL FIELD

The present invention relates to projector systems and, particularly, to improved prisms systems for laser-based image projection systems.

BACKGROUND

Projector systems are now being architected with improvements in dynamic range. Many of these types of improvements are in the area of laser projection systems. Some such laser projection systems may also comprise dual and multi-modulator projector display systems. It may be desirable to improve the performance of these improved image projection systems.

Conventional high performance Digital Light Processing (DLP) projectors use a three-channel prism assembly having a common light path bi-directionally through the color prism where white light is split into red, green, and blue and then re-combined into a full-color (white light) image. After splitting the input white light into three colors, the colors are individually modulated by dedicated DLP chips and sent back through the same color prism to re-combine the modulated light into a full color image.

Examples of such conventional prisms may be found in:
(1) U.S. Pat. No. 3,659,918, to Tan, entitled "COLOR SEPARATING PRISM SYSTEM" and issued on May 2, 1972;
(2) U.S. Pat. No. 7,665,850, to Penn, entitled "PRISM FOR HIGH CONTRAST PROJECTION" and issued on Feb. 23, 2010; and
(3) U.S. Pat. No. 7,993,014, to Penn, entitled "PRISM FOR HIGH CONTRAST PROJECTION" and issued on Aug. 9, 2011
all of which are hereby incorporated by reference in their entirety.

SUMMARY

In many embodiments of prism assemblies for projector display systems herein, the prism inputs are discrete color channels (e.g., red, green and blue channels)—as opposed to the white light input of the conventional prism assembly as described, but the modulated light may be still combined in a similar manner. This may be desirable for a number of reasons. First, "off state" light from the red, green, and blue DLP modulation is reflected away from on-state light paths within the prism, tending to avoid uncontrolled scatter. Second, the re-combination of light may be done with a Philips-style prism (as in the related patent below), but with significantly simplified coatings, allowed by the narrow-band, uni-directional discrete red/green/blue illumination sources used with this prism. Third, by keeping the colors separate for much of the prism path length, power levels may be significantly reduced at typical failure points. This allows more optical power handling capability in the prism. And finally, light efficiency may be increased significantly when using discrete light sources like LEDs and lasers by removal of the additional red, green, and blue separation and re-combination losses usually found in typical three-channel prism designs. In general, many embodiments herein optimize individual light paths to minimize scattering, losses, and thermal loads in order to provide improved efficiency, contrast, and power handling in a 3-chip DLP projector.

Coating optimization may be done to AR coatings and dichroic coatings that combine the light. The AR coatings on the input legs can be optimized per color (e.g., since each leg may see a single color) and angle (assuming higher f/# PSF relay is used). This optimization can result in better transmission (~0.2% per surface, with 7 surfaces in each discrete path). The dichroic coatings can be optimized for narrow-band light (assuming non-lamp source) which can have improved reflectance and transmission compared to broader band coatings, and also optimized for narrower angles (will vary depending on narrow band wavelength choices). Improvements in the dichroic coatings can also be critical to contrast ratio since light control is critical there and unintended reflections could reduce contrast. In other embodiments, this design may also be applied to single-chip DLP projector with monochromatic or color sequential operation. A dichroic coating is an optical coating designed to reflect a portion of light (e.g., a range of wavelengths) and transmit another portion of the light (e.g., another range of wavelengths).

In many embodiments, prisms are capable of receiving discrete illumination inputs (e.g. which may tend to aid efficiency) from discrete color laser sources. In addition, many embodiments may tend to perform well with high power and tend to reduce heat load and thermal stresses to improve power handling and reliability In one embodiment, a prism assembly for an image projector display systems is disclosed, comprising: a plurality of discrete color light input; for each discrete color light input, a prism element to receive the discrete color light input; and wherein further the heating load for each said prism element is less than the if the prism element received full spectrum illumination.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
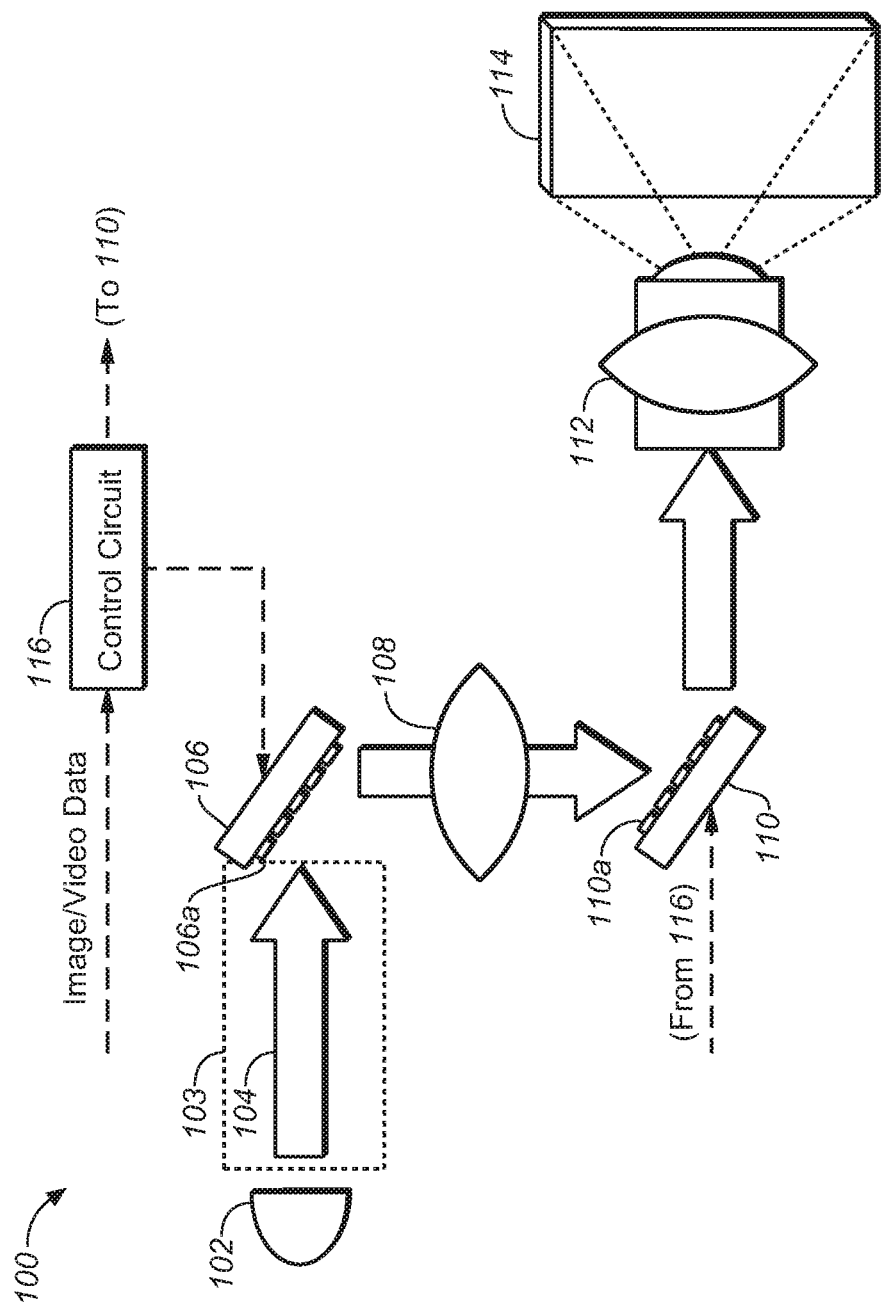
FIG. 1 depicts one schematic embodiment of an image projector display system as may be suitable for use of the improved prism input embodiments of the present application.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers. A component may also be intended to refer to a communications-related entity, either hardware, software (e.g., in execution), and/or firmware and may further comprise sufficient wired or wireless hardware to affect communications.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Introduction

In the field of projector and other display systems, it is desirable to improve both image rendering performance and system efficiency. Several embodiments of the present application describe systems, method and techniques to affect these improvements by employing light field modeling for dual, or multi-modulation display systems. In one embodiment, light source models are developed and used to advantageous effect. Camera pictures of displayed images of known input images may be evaluated to improve light models. In some embodiments, an iterative process may accumulate improvements. In some embodiments, these techniques may be used on moving images to make live adjustments to improve image rendering performance.

Dual modulation projector and display systems have been described in commonly-owned patents and patent applications, including:

(1) U.S. Pat. No. 8,125,702 to Ward et al., issued on Feb. 28, 2012 and entitled "SERIAL MODULATION DISPLAY HAVING BINARY LIGHT MODULATION STAGE";

(2) United States Patent Application 20130148037 to Whitehead et al., published on Jun. 13, 2013 and entitled "PROJECTION DISPLAYS";

(3) United States Patent Application 20110227900 to Wallener, published on Sep. 22, 2011 and entitled "CUSTOM PSFs USING CLUSTERED LIGHT SOURCES";

(4) United States Patent Application 20130106923 to Shields et al., published on May 2, 2013 and entitled "SYSTEMS AND METHODS FOR ACCURATELY REPRESENTING HIGH CONTRAST IMAGERY ON HIGH DYNAMIC RANGE DISPLAY SYSTEMS";

(5) United States Patent Application 20110279749 to Erinjippurath et al., published on Nov. 17, 2011 and entitled "HIGH DYNAMIC RANGE DISPLAYS USING FILTERLESS LCD(S) FOR INCREASING CONTRAST AND RESOLUTION" and (6) United States Patent Application 20120133689 to Kwong, published on May 31, 2012 and entitled "REFLECTORS WITH SPATIALLY VARYING REFLECTANCE/ABSORPTION GRADIENTS FOR COLOR AND LUMINANCE COMPENSATION".

all of which are hereby incorporated by reference in their entirety.

One Exemplary Physical Architecture

FIG. 1 shows one possible embodiment of a suitable image projector display system. In this embodiment, the projector display system is constructed as a dual/multi-modulator projector display system 100 that may suffice for the purposes of the present application. Projector system 100 employs a light source 102 that supplies the projector system with a desired illumination such that a final projected image will be sufficiently bright for the intended viewers of the projected image. Light source 102 may comprise any suitable light source possible—including, but not limited to: Xenon lamp, laser(s), coherent light source, partially coherent light sources. As the light source is a major draw of power and/or energy for the entire projector system, it may be desirable to advantageously use and/or re-use the light, so as to conserve the power and/or energy during the course of its operation.

Light 104 may illuminate a first modulator 106 that may, in turn, illuminate a second modulator 110, via a set of optional optical components 108. Light from second modulator 110 may be projected by a projection lens 112 (or other suitable optical components) to form a final projected image upon a screen 114. First and second modulators may be controlled by a controller 116—which may receive input image and/or video data. Controller 116 may perform certain image processing algorithms, gamut mapping algorithms or other such suitable processing upon the input image/video data and output control/data signals to first and second modulators in order to achieve a desired final projected image 114. In addition, in some projector systems, it may be possible, depending on the light source, to modulate light source 102 (control line not shown) in order to achieve additional control of the image quality of the final projected image.

Light recycling module 103 is depicted in FIG. 1 as a dotted box that may be placed in the light path from the light source 102 to the first modulator 106, as will be discussed below. While the present discussion will be given in the context of this positioning, it will be appreciated that light recycling may be inserted into the projector system at various points in the projector system. For example, light recycling may be placed between the first and second modulators. In addition, light recycling may be placed at more than one point in the optical path of the display system. While such embodiments may be more expensive due to an increase in the number of components, that increase may be balanced off against the energy cost savings as a result of multiple points of light recycling.

While the embodiment of FIG. 1 is presented in the context of a dual, multi-modulation projection system, it should be appreciated that the techniques and methods of the present application will find application in single modulation, or other dual, multi-modulation display systems. For example, a dual modulation display system comprising a backlight, a first modulator (e.g., LCD or the like), and a second modulator (e.g., LCD or the like) may employ suitable blurring optical components and image processing methods and techniques to affect the performance and efficiencies discussed herein in the context of the projection systems.

It should also be appreciated that—even though FIG. 1 depicts a two-stage or dual modulator display system—the methods and techniques of the present application may also find application in a display system with only one modulator or a display system with three or more modulator (multi-modulator) display systems. The scope of the present application encompasses these various alternative embodiments.

One Light Recycling Embodiment

Figure 2:
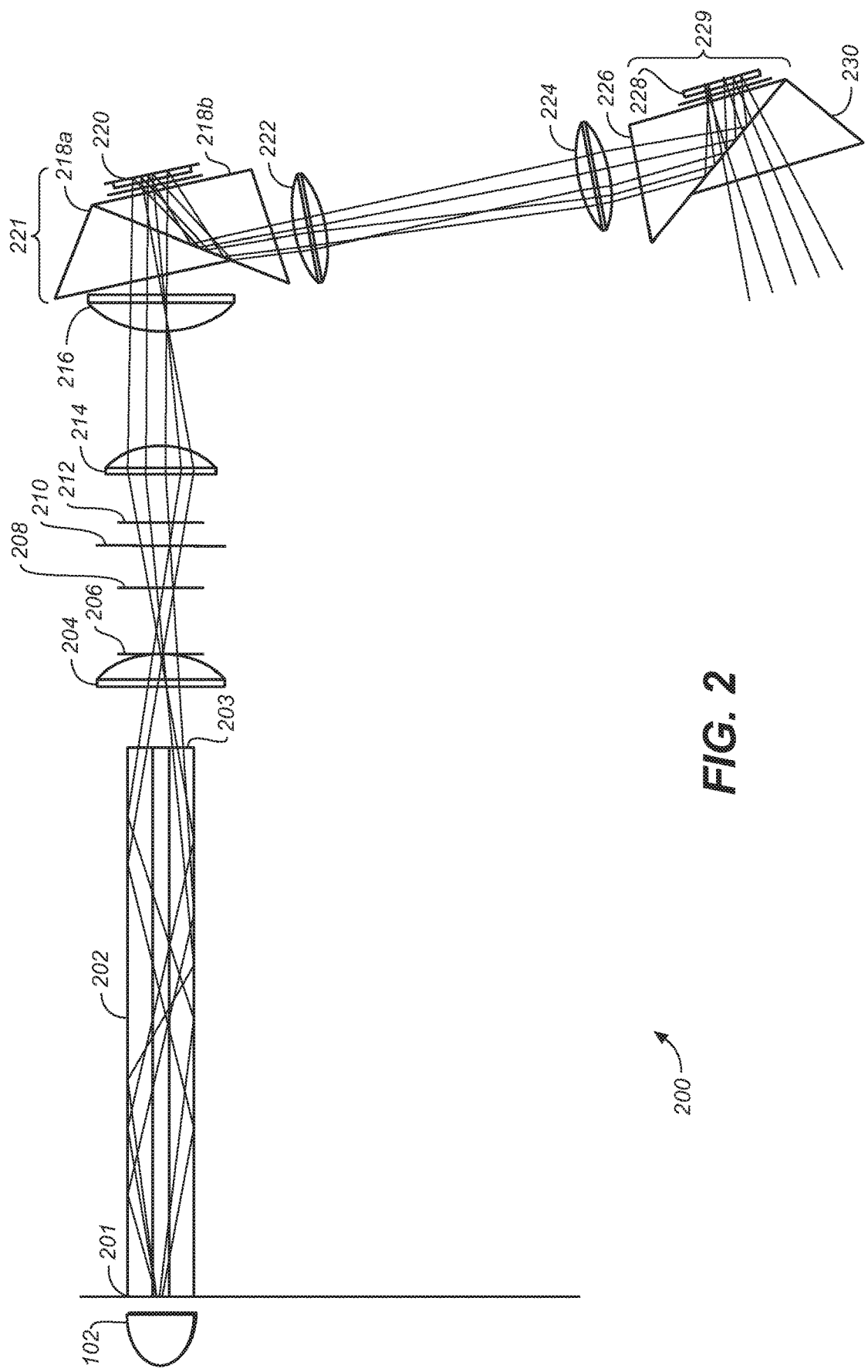
FIG. 2 depicts one embodiment of a projector system that suffices for the purposes of the present application.

FIG. 2 depicts one embodiment of a projector system, as may be suitable for the purposes of the present application. A light conduit subsystem/module (e.g., comprising one or more components from 201 to 216) may be placed in the projector system primarily between the light source 102 and a first modulator 221. Light from light source 102 may be input to the optical path via an integrating rod/tube/box 202. In one embodiment, integrating rod/tube/box 202 may comprise a substantially reflected surface in its interior, so that light that is incident on its surface may be reflected (e.g., possibly multiple times) until the light exits its extreme right end 203. Once the light exits the integrating rod/tube/box, the light may be placed into an optical path that is defined by a set of optical elements—e.g., lens 204, 214 and 216 and a set of filters and/or polarizers 206, 208, 210 and 212. This embodiment may also be constructed to perform light recycling, if desired for the design of this projector system.

First modulator 221 may comprise a number of prisms 218a, 218b and a reflector 220. Reflector 220 may comprise a Digital Micromirror Device (DMD) array of reflectors, or a Micro-Electro-Mechanical System (MEMS) array—or any other suitable set of reflectors possible that may reflect light in at least two or more paths. One such path is depicted in FIG. 2. As may be seen, reflectors 220 direct the light onto the interface of prisms 218a and 218b, such that the light may be thereby reflected into lens assembly 222 and thereafter to second modulator 229 (e.g., comprising lens assembly 224, prisms 226 and 230 and reflector 228). This light may be employed to form the finally projected image to be viewed by an audience.

However, at certain time during the rendering of the final projected image, the full power/energy of the light source 102 may not be needed. If it is not possible to modulate the power of light source 102, then it may be desired to recycle the light from light source 102. Additionally, it may be desired to increase the brightness of "highlights" in an image—and light recycled in the projector system may provide additional power. In such a case, and as may be seen in FIG. 2, it may be possible to align reflector 220 from its current position as shown (i.e., where the light is directed to travel the path down to the second modulator—to position instead where the light would be substantially reflected back to the integrating rod/tube/box 202, along substantially the same path as described as traveling from right-to-left direction.

In another embodiment, a third optional path (not shown) allows the reflectors to direct light from the light source to a light "dump"—i.e., a portion of the projector system where the light is absorbed. In this case, the light is wasted as heat to be dissipated from the projector system. Thus, the projector system may have multiple degrees of freedom when it comes to directing the light as desired.

Figure 3:
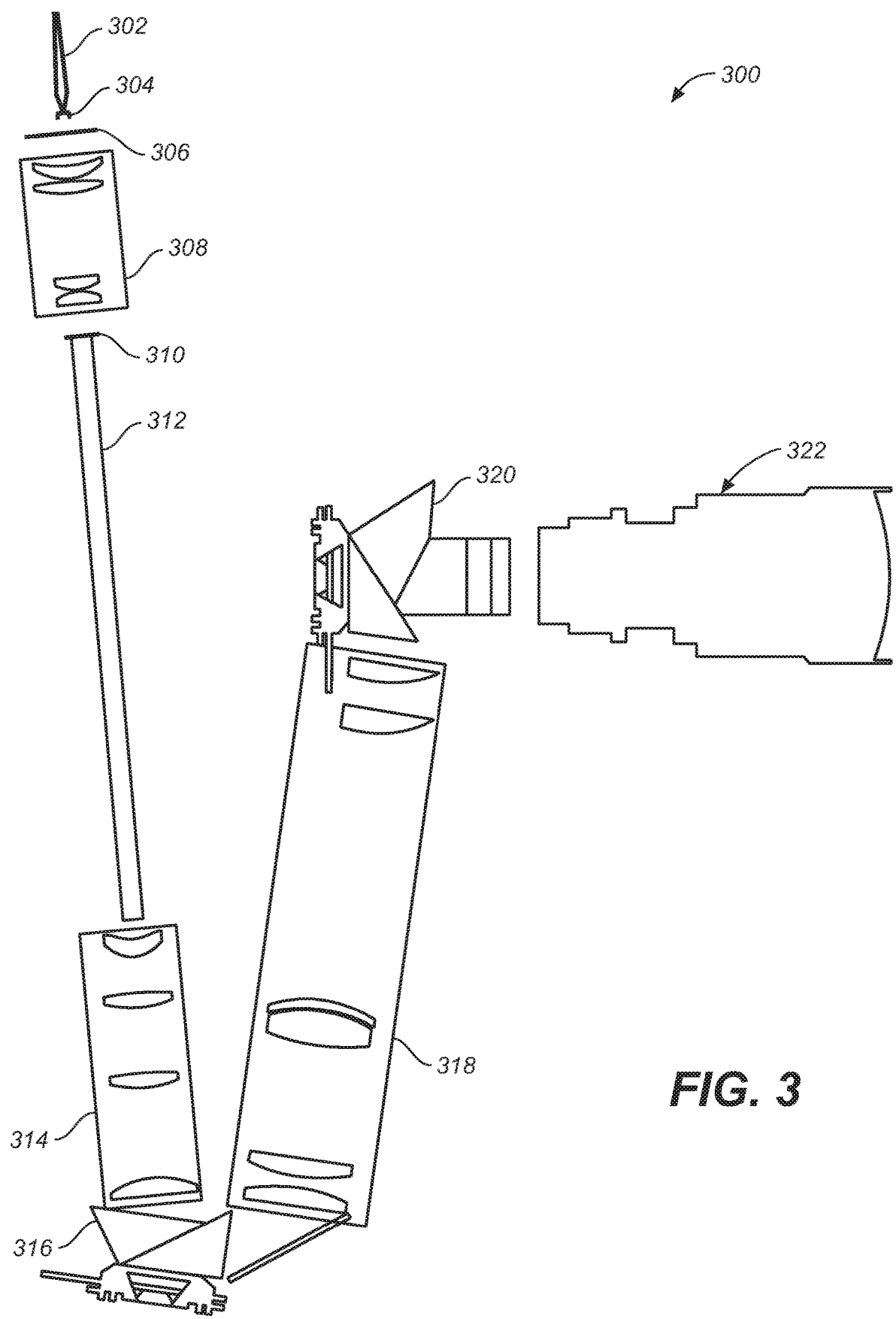
FIG. 3 depicts another embodiment of a projector system that may suffice for the purposes of the present application.

FIG. 3 is yet another embodiment of a portion of a projector system 300—which may serve to transmit light from at least one laser and/or partially coherent colored light source and ports (e.g., through fiber launch 302, collimator 304, diffuser 306). Light from such a source may transmit through a first optical subsystem/diffuser relay 308 to condition the light to be input into integrating rod 312—which may comprise the reflecting proximal end 310 (e.g., recycling mirror). A second optical subsystem/recycling relay 314 may further condition the light as desired prior to input into a first modulator 316. As with FIG. 2 above, this first leg of the system 300 may affect a light recycling mode, as discussed.

After first modulation, light may be transmitted through a third optical subsystem/Point Spread Function (PSF) relay 318 prior to input into a second modulator 320—which modulates the light for transmission through a projector optical subsystem 322 to project a final image for viewing. In continued reference to FIG. 3, there is shown a relay optical system 318 that is placed in between a first modulator 316 (e.g., a pre-modulator) and a second modulator 320 (e.g., a primary modulator/nine piece prism). Such a relay optical system may be desirable to both reduce the amount of artifacts in the image processing—as well as increasing the contrast of the projected image.

As discussed herein in the context of one embodiment, it may be desirable for the first modulator/pre-modulator to produce a blurred and/or de-focused image based upon image data values, e.g., such as a halftone image. In many embodiments, it may be desirable to have a relay optical system that tends to produce a uniformly blurred/de-focused image from the pre-modulator to the primary modulator. In addition, it may be desirable to have a desired, defocused spot shape for this embodiment.

In many embodiments, the relay optical system may comprise lenses or other optical elements that effectively moves the focal plane, corrects for any coma, and adjusts the spread (e.g., by creating defocus/blur and adding spherical aberration to some desired amount).

Improved Prism Embodiment

As discussed above, it may be desirable to improve the efficiency of these projector systems, both in terms of energy efficiency and/or in terms of cost efficiency. One such area for improvement may be made in the area of the input prism assembly, e.g., as employed in conjunction with a Spatial Light Modulator (SLM)—such as a DMD and/or MEMS array as described herein.

Figure 4A:
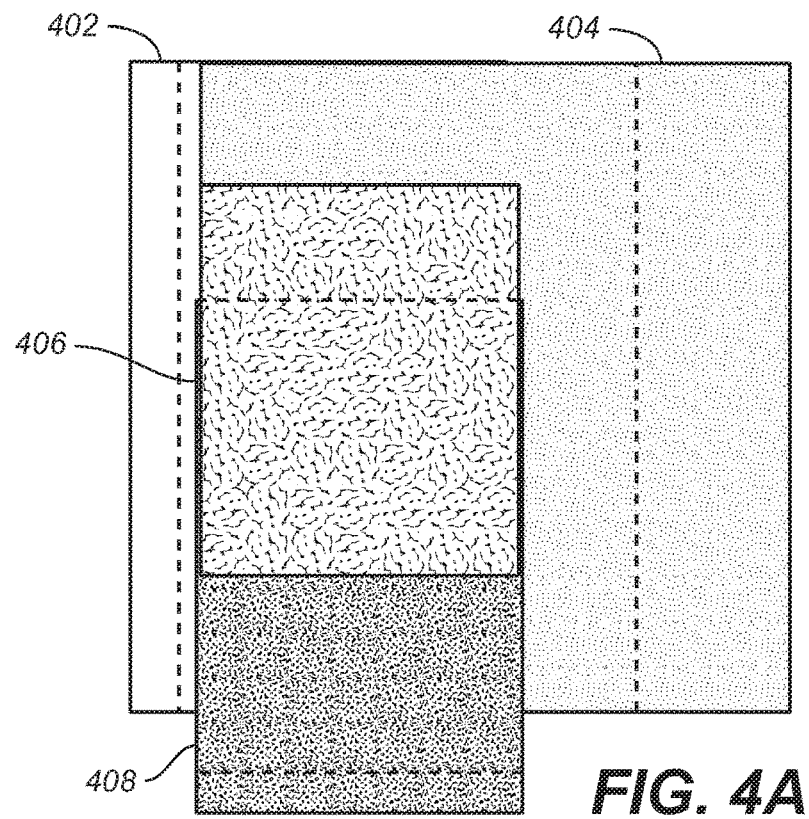
FIGS. 4A through 4C depicts a conventional prism input system, as is known in the art.
Figure 4B:
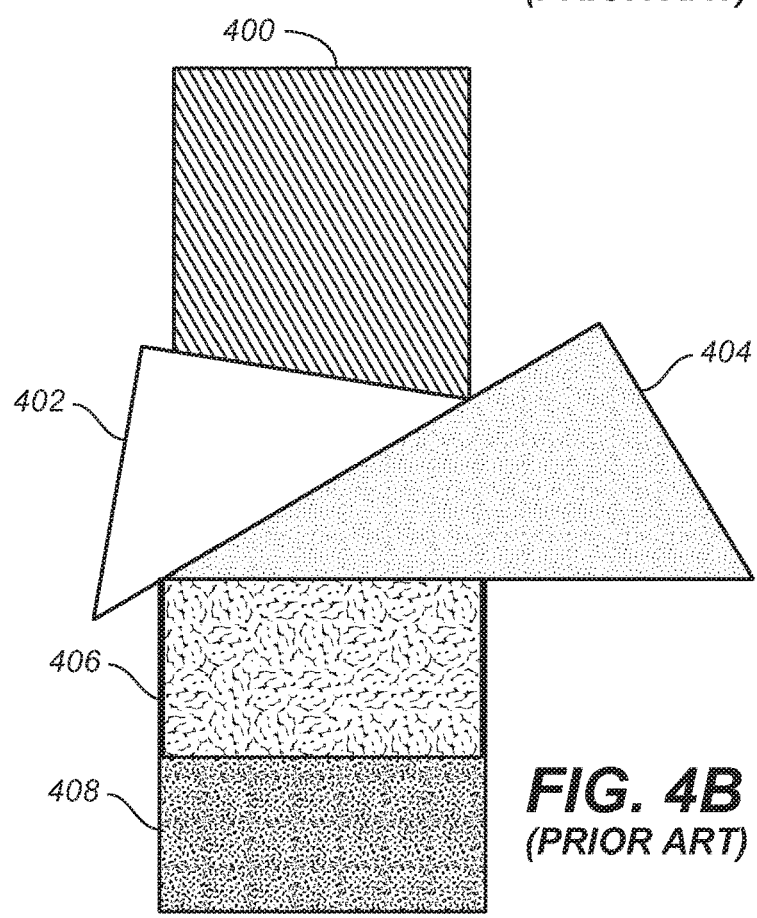
Figure 4C:
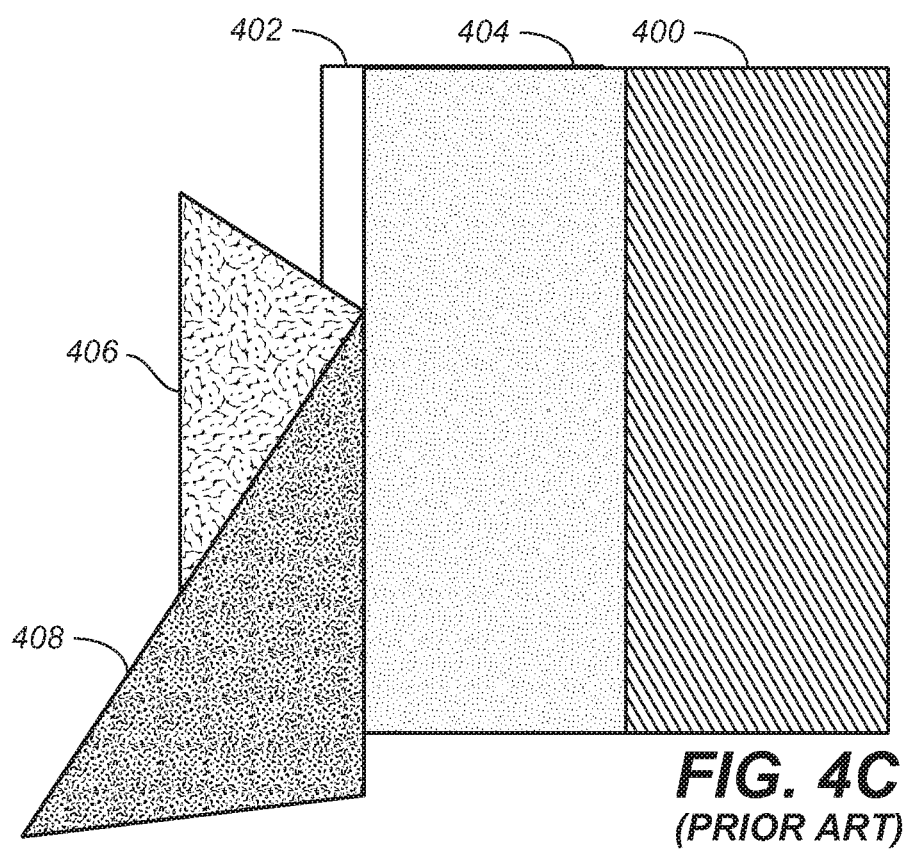

FIGS. 4A through 4C depict a conventional prism assembly in front view, top view and side view, respectively. In operation, FIGS. 5A through 5D depict how the prism assembly may interact with an input light beam, reflect the light beam off the DMD in ON state, OFF state and FLAT state orientations of the DMD reflectors, respectively.

As may be seen in FIGS. 4A through 4C and FIGS. 5A through 5D, an input light beam 502 may be transmitted through first prism 408 and Totally Internally Reflected (TIR) at the interface with second prism 406, transmitted through optical glasses 404 and 400—which is disposed proximal to DMD array 500 (depicted as light beam 504).

Figure 5A:
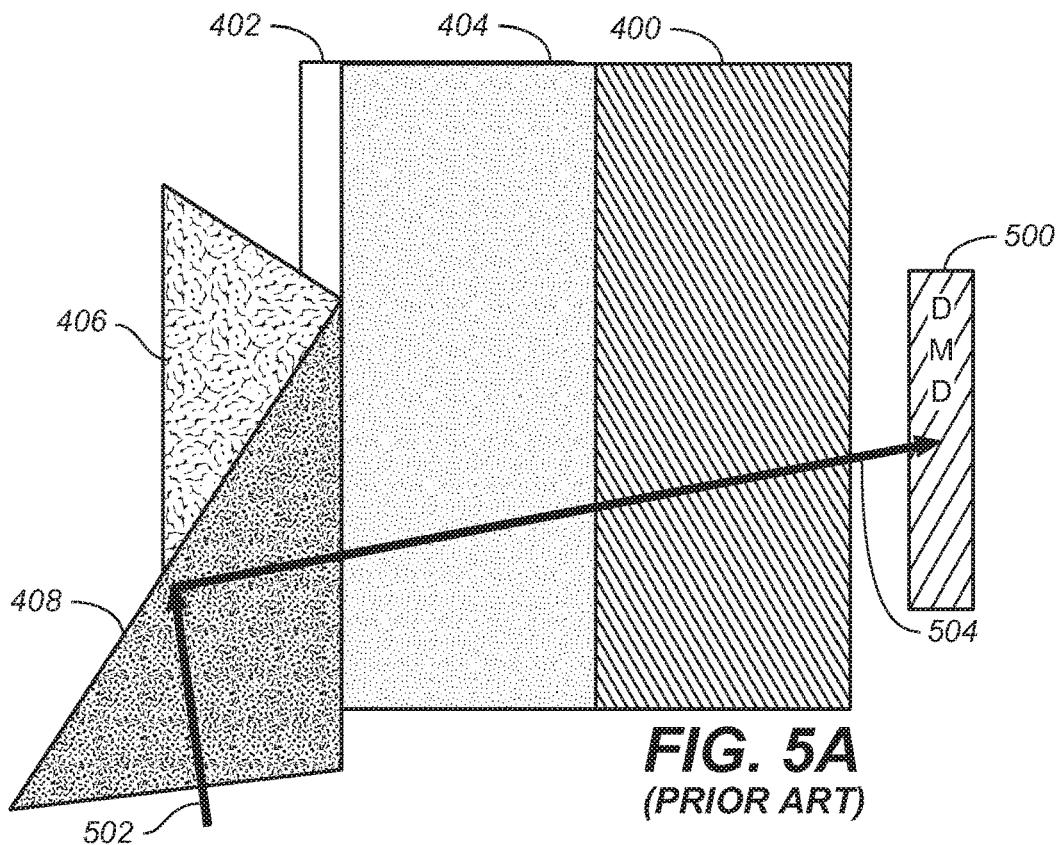
FIGS. 5A through 5D show various light paths during the operation of conventional prism input system of FIGS. 4A through 4C.
Figure 5B:
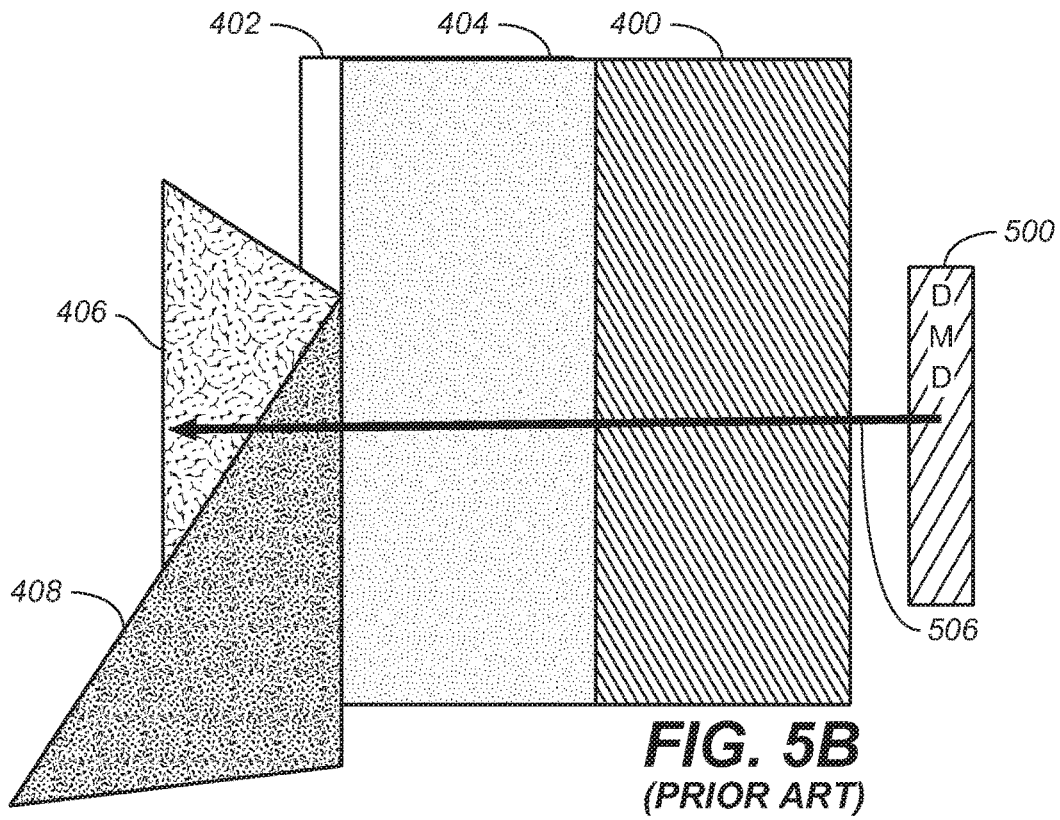
Figure 5C:
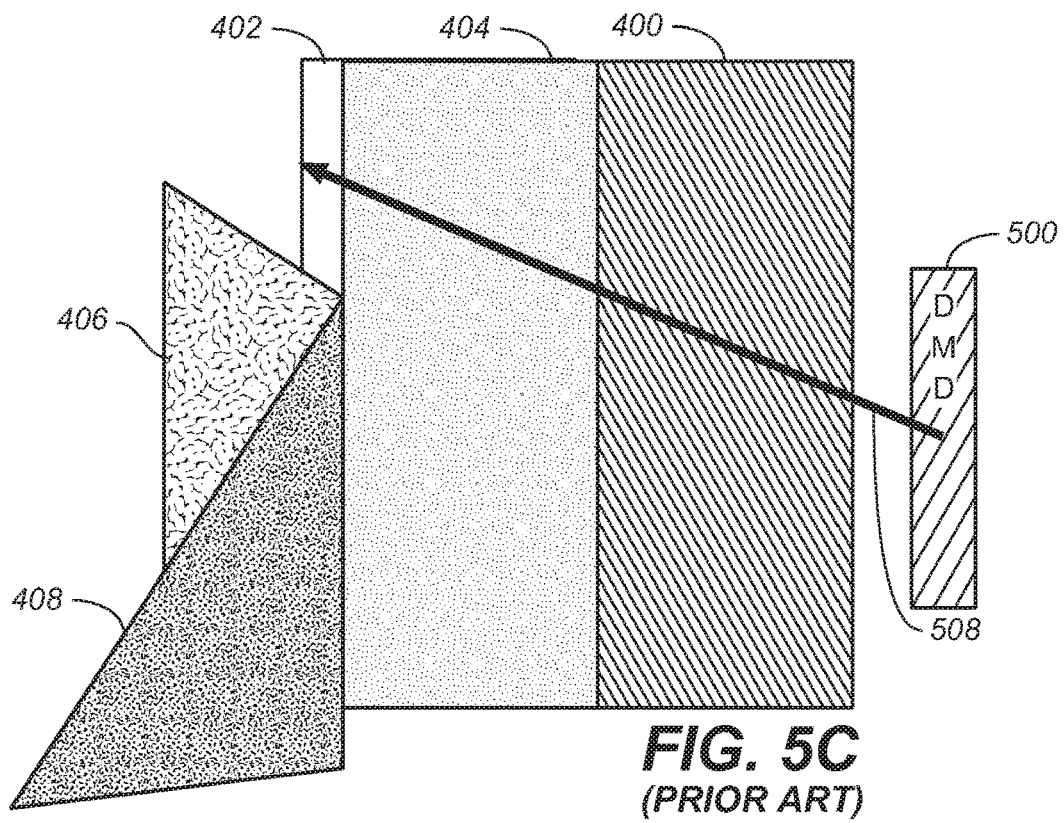
Figure 5D:
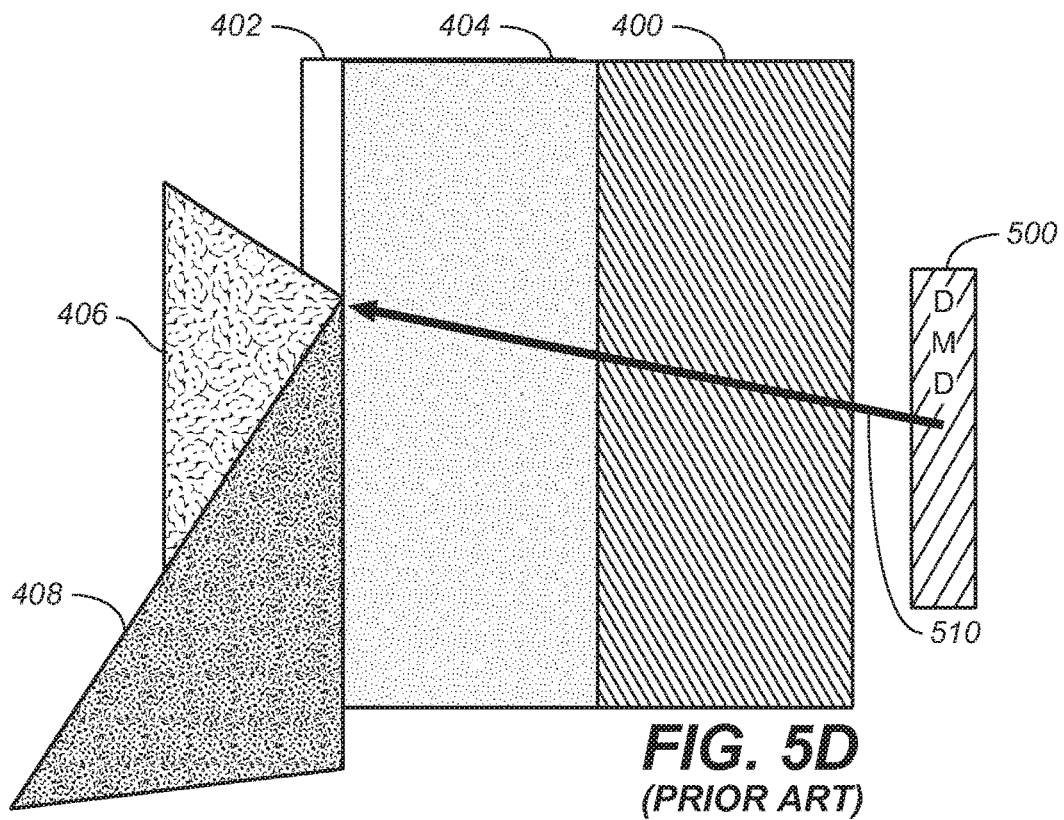
Figure 6A:
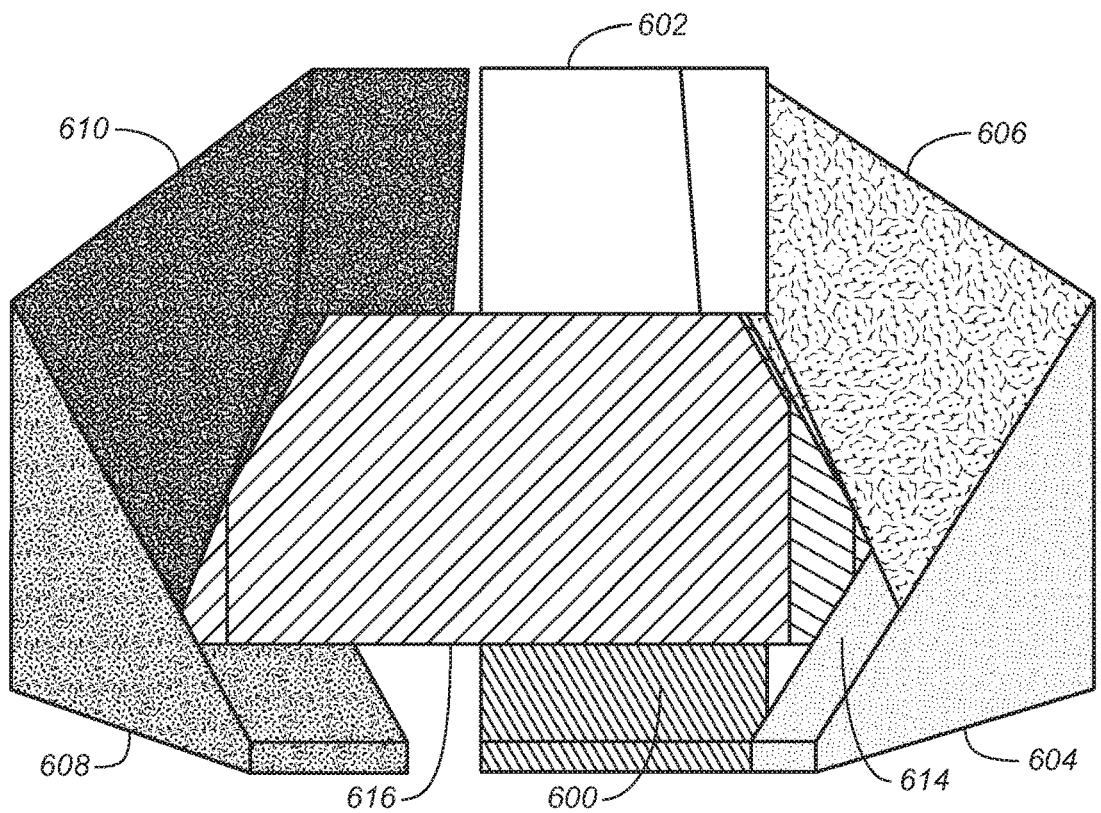
FIGS. 6A through 6D show one embodiment of a high contrast discrete input prism as made in accordance with the principles of the present application.
Figure 6B:
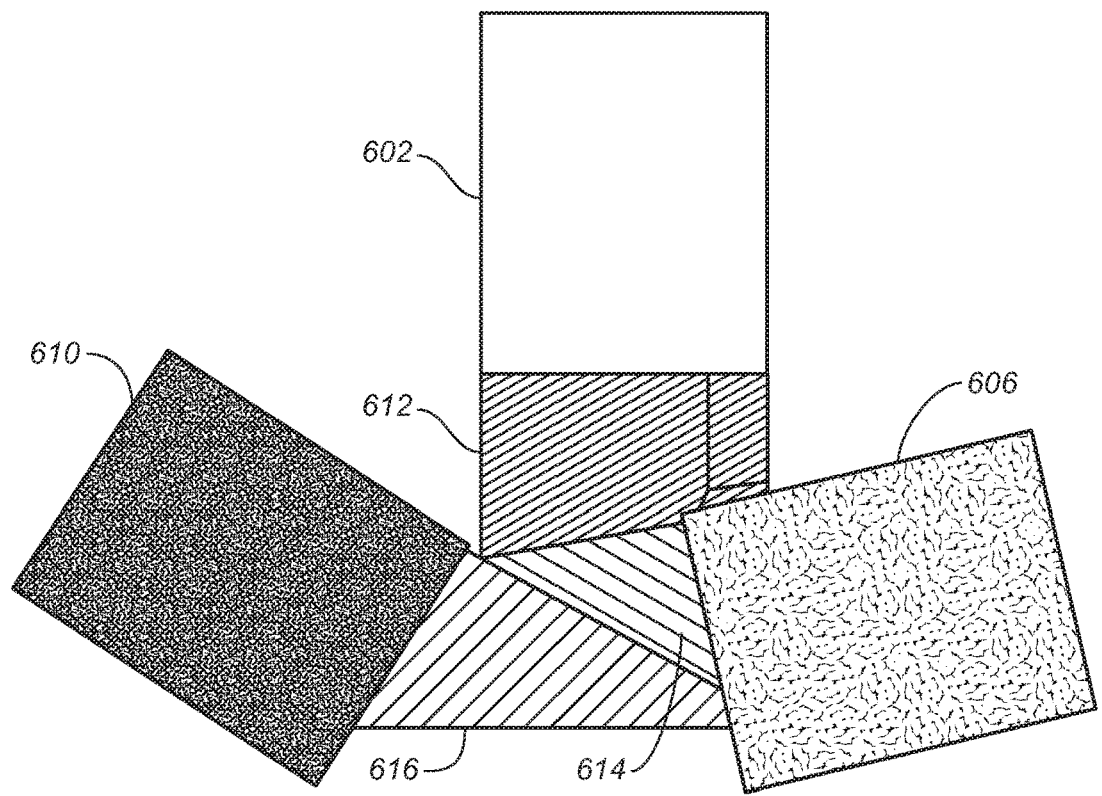
Figure 6C:
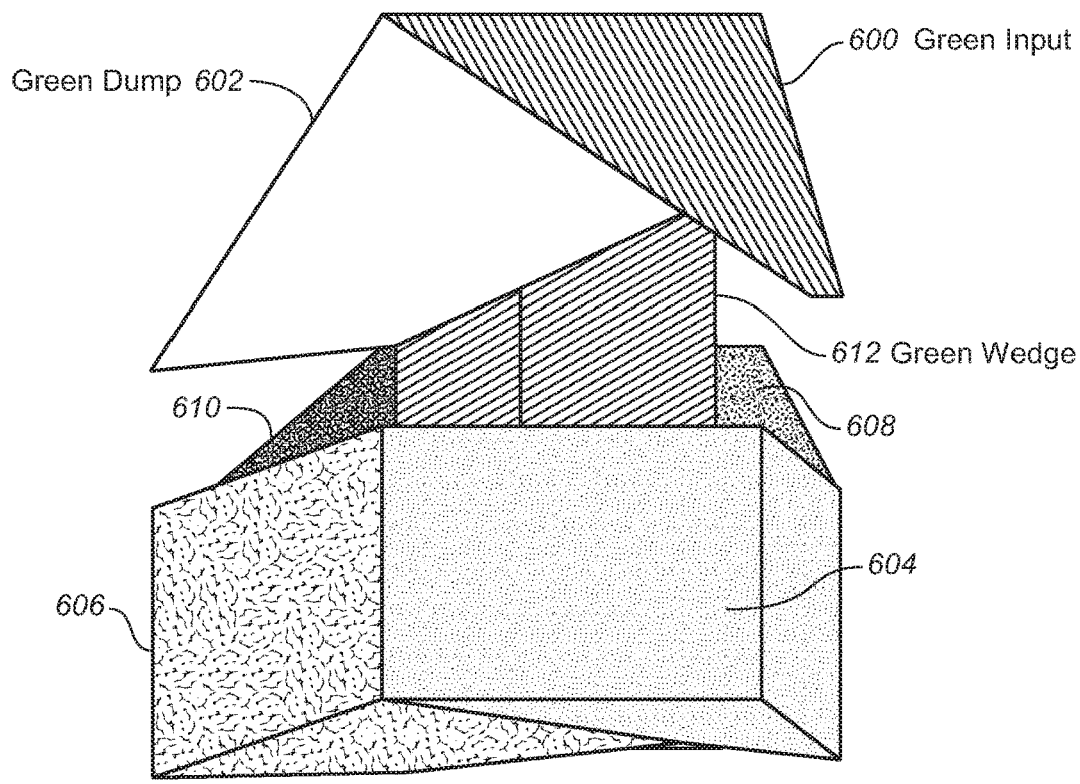
Figure 6D:
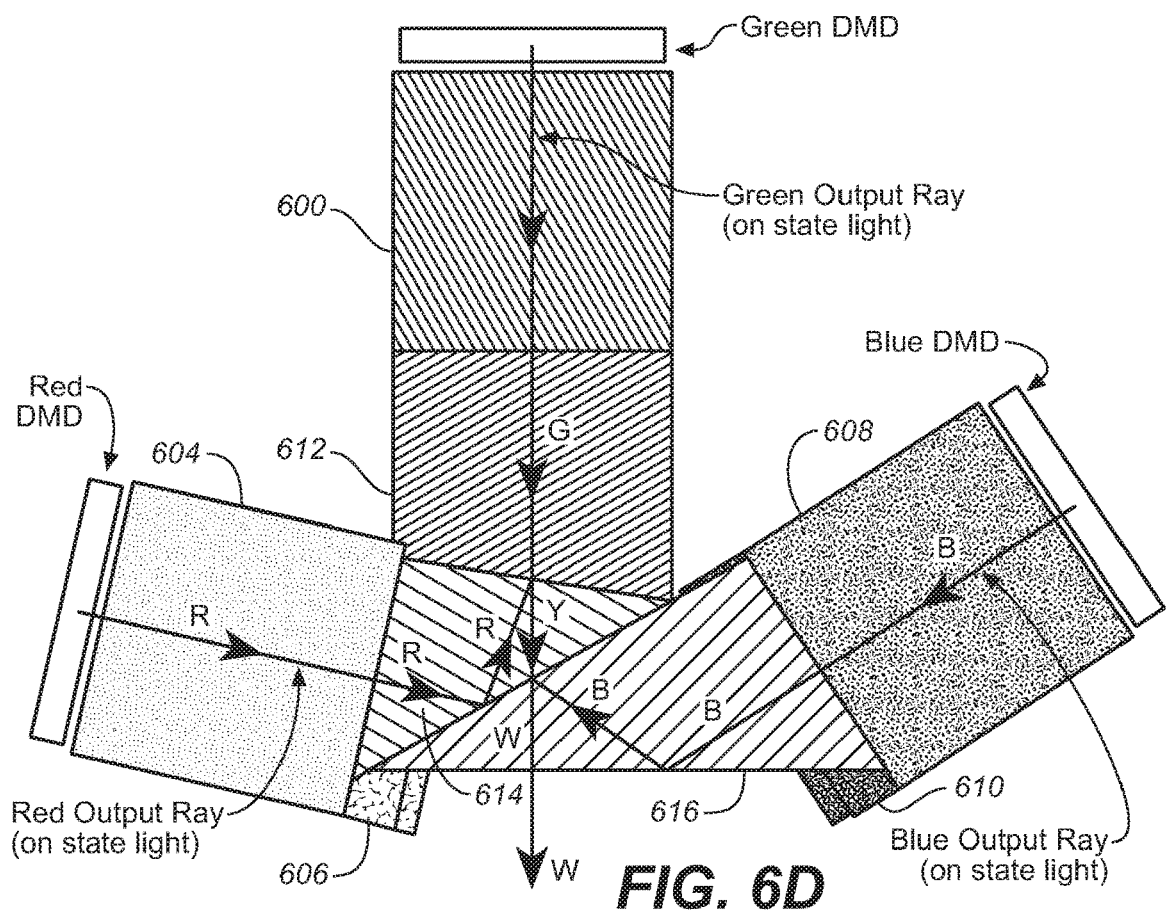

As depicted in FIG. 5B, when the DMD reflector is set to ON state, reflected light beam 506 may be transmitted back through optical elements 400, 404, 408 and 406—to provide light for further modulation and/or projection. FIG. 5C depicts the light beam 508, as may be reflected when the DMD reflector is set to the OFF state—e.g., whereby light beam 508 may be directed to a light dump (not shown), to be absorbed and/or disposed of, so as not to affect the dynamic range of the display. FIG. 5D depicts light beam 510 when the DMD reflectors are in a FLAT state orientation. As with light reflected from the DMD in the OFF state, light reflected during the FLAT state should similarly be directed away from an operative downstream light path which might include further modulation and/or projection.

When the light source is high powered, such as high powered white light (e.g. Xenon lamp or the like) or high powered colored laser light, then heat may present undesired thermal effects that may manifest themselves in either undesirable imaging effects and/or mechanical element degradation. Undesirable effects may include change in PSF shape and/or size and positional drift of image from pre-mod to primary modulator over time and heat cycling.

FIGS. 6A through 6D show one embodiment of a prism assembly as made in accordance with the principles of the present application—given a front view, top view, side view and bottom view, respectively. As may be seen, the present prism assembly comprises optical elements 600, 602, 604, 606, 608, 610, 612, 614 and 616. In this embodiment, optical elements may be employed to operate on one or more color channels—making separate color channel prism paths for each separate color light that is received by the prism assembly.

For example, in the green channel as one of the separate color channel prism paths, optical element 602 is a green dump wedge, optical element 612 is a green wedge and optical element 600 is a green input wedge. In the blue channel, optical element 608 is a blue input wedge, optical element 610 is a blue dump wedge and optical element 616 is a blue wedge. In the red channel, optical element 606 is a red dump wedge, optical element 614 is a red wedge and optical element 604 is a red input wedge. It should be noted that each color channel has a number of optical elements deployed for the processing of the colored light input.

It should be appreciated that while one embodiment may take in separate colored light input (e.g., from lasers, LEDS, partially coherent light sources or the like), other embodiments may take in white light input (e.g., from Xenon lamp or the like). In such embodiments, it may be possible to separate the various color components from the white light prior to prism assembly (e.g., with another, initial, prism assembly or the like) and then process the separate color components with the prism assembly as made in accordance with the principles of the present application.

Figure 7A:
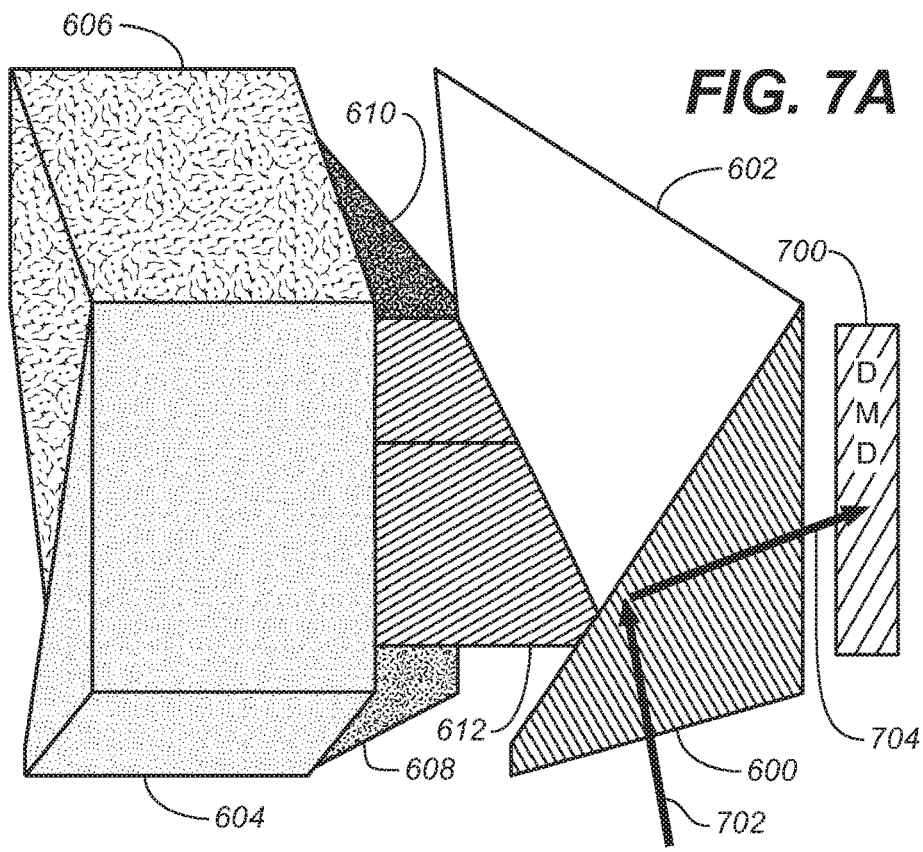
FIGS. 7A through 7D show various light paths during the operation of conventional prism input system of FIGS. 6A through 6D.

In operation, FIGS. 7A through 7D depict the manner in which input light beams would be processed by the prism assembly of the present application. FIG. 7A depicts the situation where a beam of green light (e.g., from white light, green laser light and/or partially coherent green light) is input into the system (as beam 702). Beam 702 reflects off the surface of wedge 600 as shown and transmitted to the DMD reflector 700 (as beam 704).

Figure 7B:
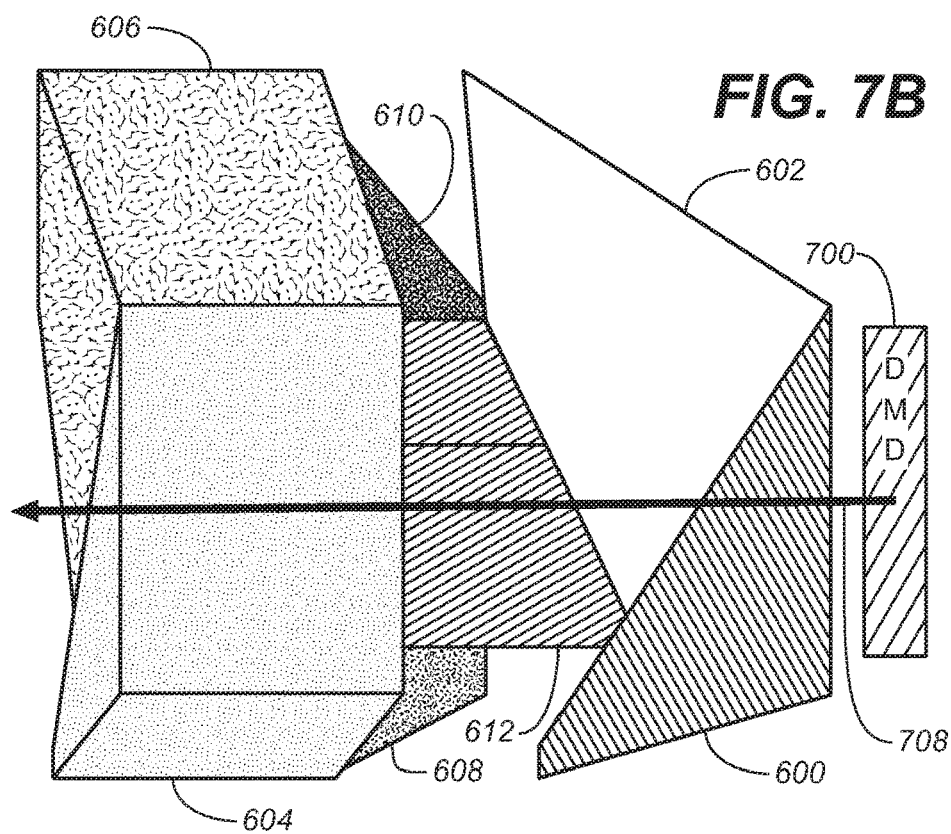
Figure 7C:
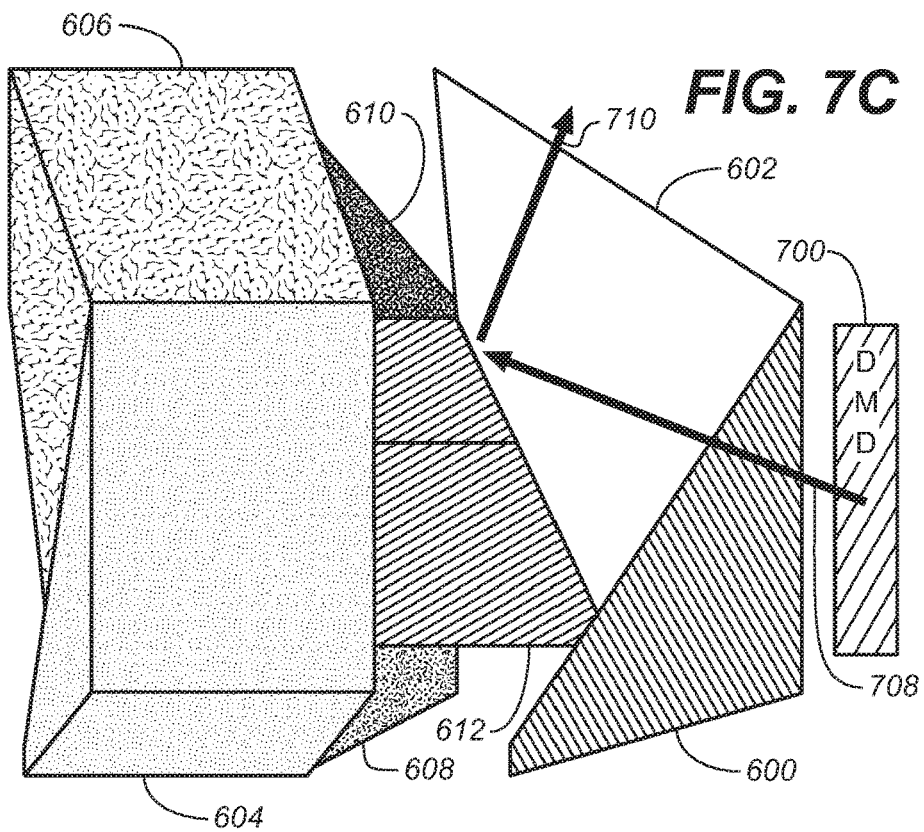
Figure 7D:
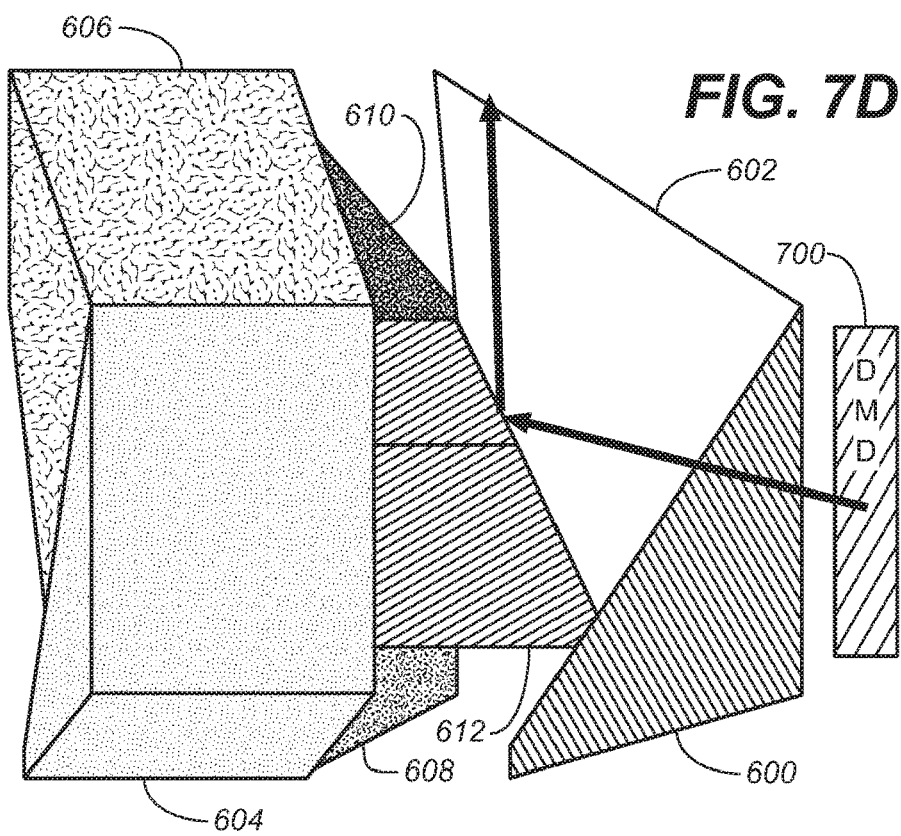

FIG. 7B depicts the reflected beam 708 when the DMD reflector is set in the ON state. Beam 708 is transmitted through the green wedge 612 for further modulation and/or projection. FIG. 7C depicts the reflected beam 708 when the DMD reflector is set in the OFF state. Beam 708 is transmitted through the green dump wedge 602—to prevent further modulation and/or projection. FIG. 7D depicts the reflected beam 708 when the DMD reflector is set in the FLAT state. Beam 708 is again transmitted through the green dump wedge 602—to again prevent further modulation and/or projection.

Improved Thermal Profile

Figure 8:
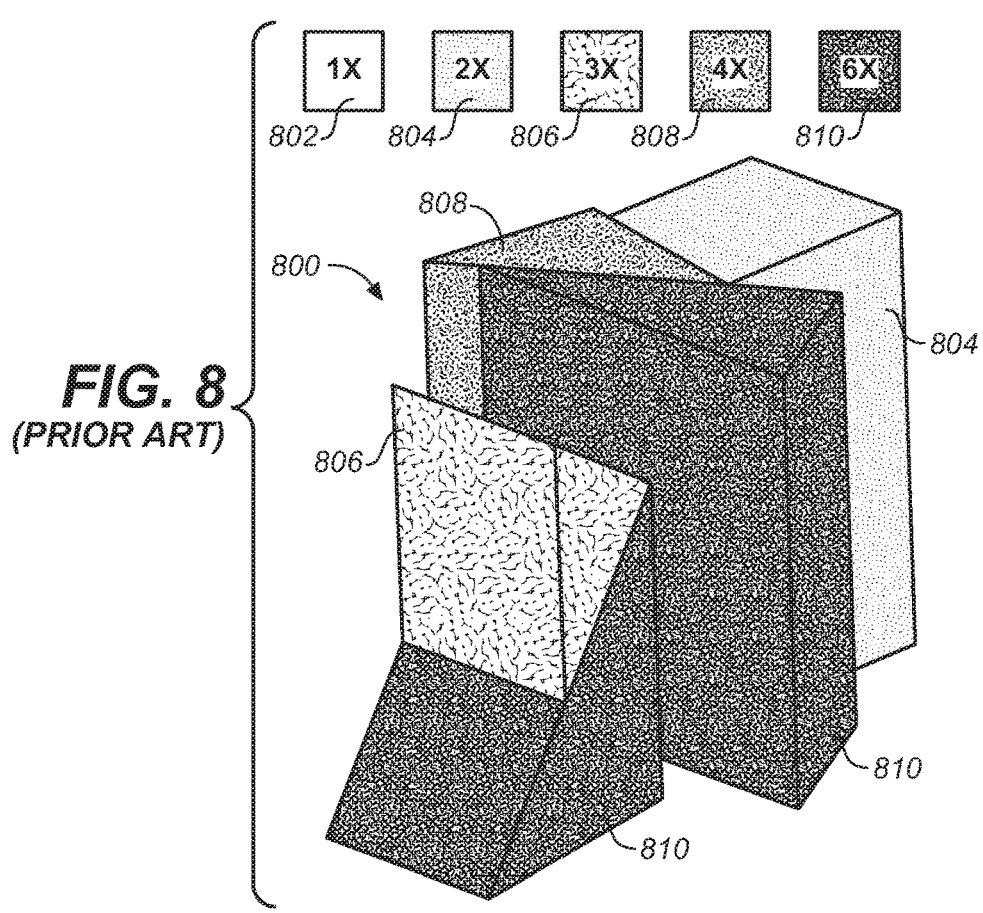
FIG. 8 depicts one exemplary plot of the thermal loading of the conventional prism as shown in FIGS. 4A through 4C while processing full light power of a projector system.

As mentioned above, today's projector systems are illuminated with higher power light sources. Such light sources may include Xenon white lamps, high powered colored lasers, and/or high powered partially coherent light sources. The performance of such prior art prism designs may not be desirable for many reasons in high powered image projector display system. For merely one example, FIG. 8 depicts the thermal load of the conventional prism (e.g., same or similar prism as shown as FIGS. 4A through 4C).

As may be seen, the thermal loads in the legend proceed from lowest to highest as: 1× (802), 2× (804), 3× (806), 4× (808) and 6× (810). As may be seen the prior art prism—under full illumination—purports to have many regions of high thermal load as noted.

Figure 9:
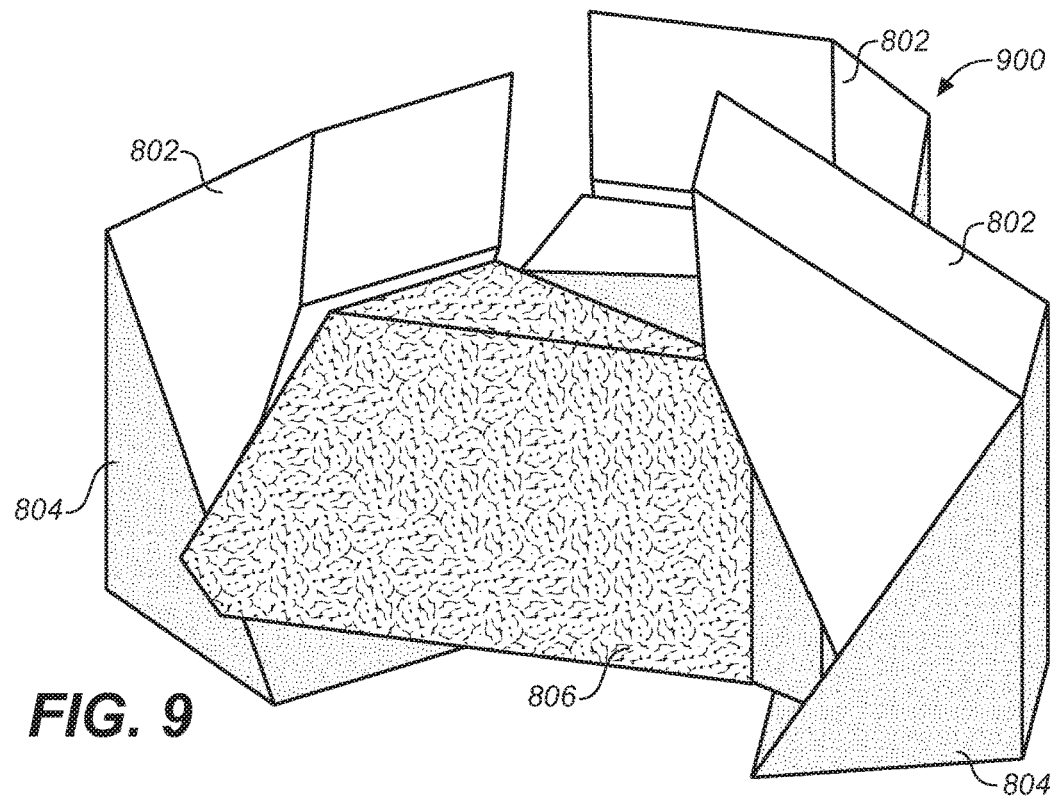
FIG. 9 depicts one exemplary plot of the thermal loading of the high contrast discrete input prism as shown in FIGS. 6A through 6D while processing full light power of a projector system.

By contrast, FIG. 9 depicts the thermal loading of the 9-piece prism arrangement of FIGS. 6A through 6D, and other embodiments as made in accordance with the principles of the present application. In this embodiment, as the prism assembly may input separate, discrete color channels of illumination, it may be seen that the thermal loading of this prism assembly is better distributed.

Alternative Embodiments

As discussed herein, several alternative embodiments may include:
(1) Significantly Simplified Dichroic Coatings
(2) Single pass at single nominal angle unlike current 3-chip prisms. (For example, it may not go through the color prism on entry at a different angle through the wedges/coatings.)
(3) f/4.5 has significantly smaller angular spread
(4) 2-3× thermal absorption margin on every element
(5) Natively higher contrast due to reduced scatter
(6) Reduction/Elimination of back scatter from illumination path (For example, due to one less pass through the dichroics and some of the AR coatings.)
(7) Reduction/Elimination of forward scatter from off state light path in color prism. (For example, due to one less pass through the dichroics and some of the AR coatings.)
(8) Shorter color prism to reduce cost
(9) Removes color combine/separation losses for laser source on current dual 6 piece prism design
(10) Discrete light dump for each color for higher power and/or improved thermal management In many embodiments, the following ranges of f/# may suffice: f/2 to f/3 for non-laser illumination and f/4 to f/8 for laser illumination. For some preferred embodiments, the range can be f/2.4 to f/3 for non-laser illumination and f/4 to f/5 for laser illumination. Specific examples may include f/2.4 for typical xenon and f/4.5 for typical laser.

Coating optimization may be done to Anti-Reflective (AR) coatings and dichroic coatings that combine the light. The AR coatings on the input legs can be optimized per color (e.g., since each leg may see a single color) and angle (assuming higher f/# PSF relay is used). This optimization can result in better transmission (~0.2% per surface, with 7 surfaces in each discrete path). In some cases, the angle is in reference to 'angle of incidence'—where, in some cases for lower angles, it may be easier to get better coating transmissions. The dichroic coatings can be optimized for narrowband light (assuming non-lamp source) which can have improved reflectance and transmission compared to broader band coatings, and also optimized for narrower angles (will vary depending on narrow band wavelength choices). In some embodiments, coatings may be applied at various interfaces in the prism assembly. For example, in FIG. 6D, a red reflect/green transmit dichroic coating may be applied at the interface between 612 and 614. A blue reflect/green and red transmit dichroic coating may be applied at the interface between 614 and 616. As input light does not go through the coatings in its entirety, it tends to avoid the opportunity to scatter or partially reflect.

Improvements in the dichroic coatings can also be useful to contrast ratio since light control may be desirable there and any unintended reflections may reduce contrast. In other embodiments, this design may also be applied to single-chip DLP projector with monochromatic or color sequential operation.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A prism assembly, comprising:
   a plurality of prisms configured to form a plurality of separate prism light paths, each of the separate prism light paths receiving a separate light input from a plurality of separate light inputs; and
   a plurality of anti-reflective (AR) coatings, each of the AR coatings optimized for a respective one of the separate light inputs travelling a corresponding one of the separate prism light paths.

2. The prism assembly of claim 1, wherein each of the separate prism light path is formed by:
   an input wedge element;
   a second wedge element; and
   a dump wedge element.

3. The prism assembly of claim 1, further comprising:
   a plurality of color channel modulators corresponding to respective ones of the separate prism light paths, each of the color channel modulators configured to receive one of the separate light inputs and affecting one or more operational modes.

4. The prism assembly of claim 3, wherein each of the color channel modulators comprises a digital micromirror device (DMD) reflector.

5. The prism assembly of claim 3, wherein each of the color channel modulators affects at least an ON state, and an OFF state.

6. The prism assembly of claim 1, wherein the separate light inputs are supplied by lasers, light-emitting diodes (LEDs), or partially coherent light sources.

7. The prism assembly of claim 1, further comprising:
   an initial prism assembly configured to receive a white light input and to convert the white light into the plurality of separate light inputs.

8. The prism assembly of claim 1, wherein each of the AR coatings is optimized for a range of angles of a corresponding light input travelling a corresponding separate prism light path.

9. The prism assembly of claim 1, wherein each of the separate prism light path receives the separate light input at a nominal angle.

10. The prism assembly of claim 1, wherein each of the separate prism light path comprises an f/# of at least substantially f/4.5.

11. The prism assembly of claim 1, wherein each of the separate prism light path comprises a separate light dump for each separate light input.

12. A device, comprising:
   one or more light sources configured to supply a plurality of color light inputs;
   a prism assembly comprising a plurality of separate color channel prism paths, each separate color prism path configured to receive a respective one of the color light inputs; and
   a plurality of color channel modulator, each color channel modulator disposed in a corresponding separate color channel prism path and configured to modulate a corresponding color light input;
   wherein the plurality of color light inputs comprise a first color light input and a second color light input, and the plurality of separate color channel prism paths comprise a first color channel prism path for the first color light input and a second color channel prism path for the second color light input; and
   wherein the device further comprises:
      a first dichroic coating applied at an interface between the first color channel prism path and the second color channel prism path and configured to transmit the first color light input and to reflect the second color light input;
   wherein the plurality of color light inputs further comprise a third color light input, and the plurality of separate color channel prism paths further comprise a third color channel prism path for the third color light input; and
   wherein the device further comprises:
      a second dichroic coating applied at an interface between the second color channel prism path and the third color channel prism path and configured to transmit the first and second color light inputs and to reflect the third color light input.

13. The device of claim 12, wherein the one or more light sources comprises a plurality of color light sources configured to supply the color light inputs respectively.

14. The device of claim 12, wherein the one or more light sources comprises:
   a light source configured to supply a white light input; and an optical component configured to convert the white light input into the color light inputs.

* * * * *